US012439156B2

United States Patent
Duan et al.

(10) Patent No.: US 12,439,156 B2
(45) Date of Patent: Oct. 7, 2025

(54) CONTENT BASED FOCUS ADJUSTMENT

(71) Applicant: International Business Machines Corporation, Armonk, NY (US)

(72) Inventors: Jun Feng Duan, Beijing (CN); Jun Su, Beijing (CN); Guang Han Sui, Beijing (CN); Peng Hui Jiang, Beijing (CN); Su Liu, Austin, TX (US); Yu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 18/241,264

(22) Filed: Sep. 1, 2023

(65) Prior Publication Data
US 2025/0080843 A1 Mar. 6, 2025

(51) Int. Cl.
*H04N 23/67* (2023.01)
*H04N 23/61* (2023.01)
*H04N 23/69* (2023.01)

(52) U.S. Cl.
CPC ........... *H04N 23/675* (2023.01); *H04N 23/61* (2023.01); *H04N 23/69* (2023.01)

(58) Field of Classification Search
CPC ....... H04N 23/675; H04N 23/69; H04N 23/61
USPC ........................................................ 348/345
See application file for complete search history.

(56) References Cited

U.S. PATENT DOCUMENTS

| | | | |
|---|---|---|---|
| 8,842,161 B2 * | 9/2014 | Feng | H04N 7/15 348/14.08 |
| 9,467,657 B2 * | 10/2016 | Decker | H04N 5/2628 |
| 9,641,585 B2 * | 5/2017 | Kvaal | G11B 27/031 |
| 9,883,143 B2 * | 1/2018 | Tangeland | H04N 7/147 |
| 9,942,516 B1 | 4/2018 | Pell | |
| 11,558,209 B1 * | 1/2023 | Lum | G06V 40/161 |
| 11,863,306 B2 * | 1/2024 | Lum | G06V 20/52 |

(Continued)

FOREIGN PATENT DOCUMENTS

| | | |
|---|---|---|
| CN | 104010131 A | 8/2014 |
| CN | 113676693 A | 11/2021 |

(Continued)

OTHER PUBLICATIONS

Anonymous, "Method and System for Tracking the Focus Area of a Presenter and Displaying the Same During a Video Conference", An IP.com Prior Art Database Technical Disclosure, IP.com No. IPCOM000252958D, IP.com Electronic Publication Date: Feb. 23, 2018, 3 pages.

*Primary Examiner* — Pritham D Prabhakher
(74) *Attorney, Agent, or Firm* — Daniel M. Yeates

(57) ABSTRACT

A computer-implemented method to automatically adjust a view of a video stream to focus on a relevant item. The method includes monitoring activity in video feed of a video conference. The method further includes identifying, in the video feed, an item that a user is interacting with during the video conference. The method also includes determining a relevance score for to the item, where the relevance score represents a likelihood the item is a focus of the video conference. The method includes determining the relevance score is above a relevance threshold for the item. The method also includes adjusting, in response to the relevance score being above the relevance threshold, a focus the video feed, where the adjusting is configured to focus on the item.

17 Claims, 4 Drawing Sheets

(56) References Cited

U.S. PATENT DOCUMENTS

| | | | | |
|---|---|---|---|---|
| 2009/0015658 A1* | 1/2009 | Enstad | .................... | H04N 7/15 |
| | | | | 348/240.99 |
| 2015/0033146 A1 | 1/2015 | Wu | | |
| 2015/0201161 A1* | 7/2015 | Lachapelle | .............. | H04N 7/15 |
| | | | | 348/14.07 |
| 2016/0359941 A1* | 12/2016 | Kvaal | .................. | H04L 65/403 |
| 2020/0344278 A1* | 10/2020 | Mackell | ................. | H04N 7/147 |
| 2022/0272255 A1* | 8/2022 | Xiong | ................. | H04N 23/695 |
| 2023/0035582 A1 | 2/2023 | Lum | | |
| 2023/0118583 A1* | 4/2023 | Lum | .................. | G06F 18/2431 |
| | | | | 709/204 |
| 2024/0214232 A1* | 6/2024 | Reszka | ............... | G06V 40/178 |

FOREIGN PATENT DOCUMENTS

| | | |
|---|---|---|
| CN | 115334249 A | 10/2022 |
| CN | 115909493 A | 11/2022 |

\* cited by examiner

CONTENT BASED FOCUS ADJUSTMENT

BACKGROUND

The present disclosure relates to an online meeting, and, more specifically, adjusting the focus of a video stream to a contextually relevant item.

Generally, during a video conference a feed has a fixed data source such as a camera. In some instances, the camera can be adjusted to change the view sent to a viewing device. Some cameras can automatically track and/or change focus between one or more users.

SUMMARY

Disclosed is a computer-implemented method to automatically adjusting a view of a video stream to focus on a relevant item. The method includes monitoring activity in video feed of a video conference. The method further includes identifying, in the video feed, an item that a user is interacting with during the video conference. The method also includes determining a relevance score for to the item, where the relevance score represents a likelihood the item is a focus of the video conference. The method includes determining the relevance score is above a relevance threshold for the item. The method also includes adjusting, in response to the relevance score being above the relevance threshold, a focus the video feed, where the adjusting is configured to focus on the item. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
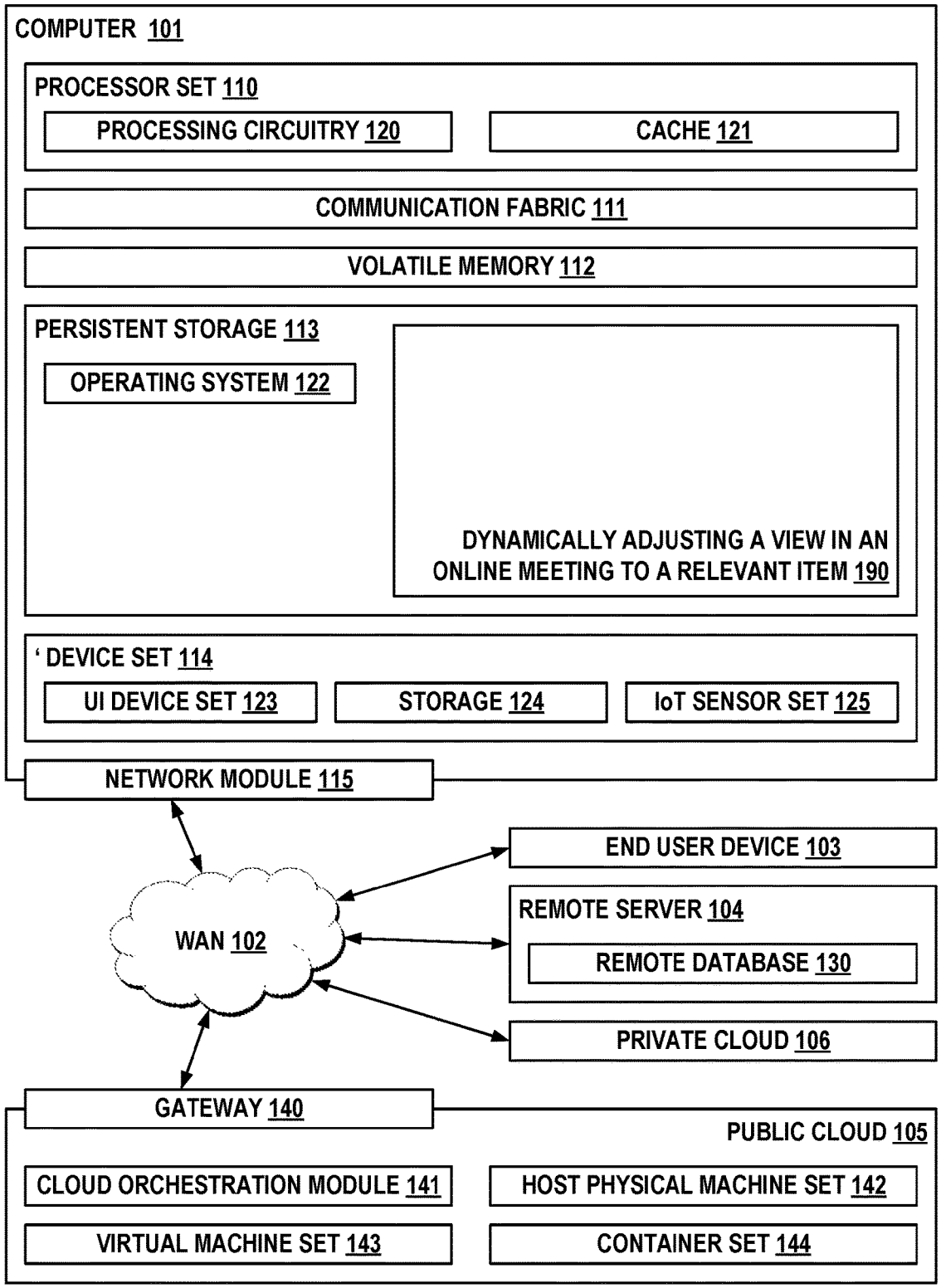
FIG. 1 depicts a cloud computing environment according to an embodiment of the present invention.

The present disclosure relates to a video device that adjusts the focus based on the item a user is interacting with during a video conference.

A video device (e.g., camera) automatically tracks a user during the event and adjust the focus for such user so as to always keep the focus on the user. However, the user might need interact with an item during the event, but such item might not be completely captured by the video device and cannot be completely shown due to the focus on the user.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as dynamically adjusting a view in an online meeting to a relevant item 190. In addition to block 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 190, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 195 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 195 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The present disclosure relates to a video device, and, more specifically, adjusting the focus based on the item a user is interacting with during a video conference.

In video conferencing or live streaming of an event, there has been technology where a video device (e.g., camera) can automatically tracks a user during the event and adjust the camera to keep the user in frame. However, the user might need to present an item or interact with an item. Such item might not be completely captured by the video device and shown properly in the event.

In some systems, cameras and other similar devices can be adjusted to focus on different users during a streaming event. However, the focus is still on a user. In some scenarios, the user can interact with a non-user item. For example, the user may be showing a new widget that was recently purchased. In these cases, focusing the camera on the item would enhance the viewing experience of the other participants. However, the item cannot be properly captured or cannot be completely shown due to the focus on the user.

In order to better provide a viewing experience when a video feed is focused on non-user object, embodiments of the present disclosure can adjust a focus of a stream on a non-user item that is a pertinent to a current context of the meeting. In some embodiments, a streaming device automatically tracks a user and/or one or more items during the event (e.g., online meeting). Embodiments of the present disclosure track the line of sight, hand gestures, words spoken, and other contextual data to determine if the user is interacting with an item. Embodiments of the present disclosure analyze the identified item and determine whether the item is relevant to the current context of the meeting. In some embodiments, a relevance score is calculated. Once the relevancy score exceeds a relevancy threshold, a focus controller can adjust the zoom of the camera to focus on the item as a central aspect of the stream. The adjustment can be configured to give a better display of the item to a viewing person on a remote device in communication with the streaming device.

If it is determined that the relevance threshold has not been met or if the item is not properly displayed, Context Manager will continue to monitor the video conferencing event.

The aforementioned advantages are example advantages, and embodiments exist that can contain all, some, or none of the aforementioned advantages while remaining within the spirit and scope of the present disclosure.

Figure 2:
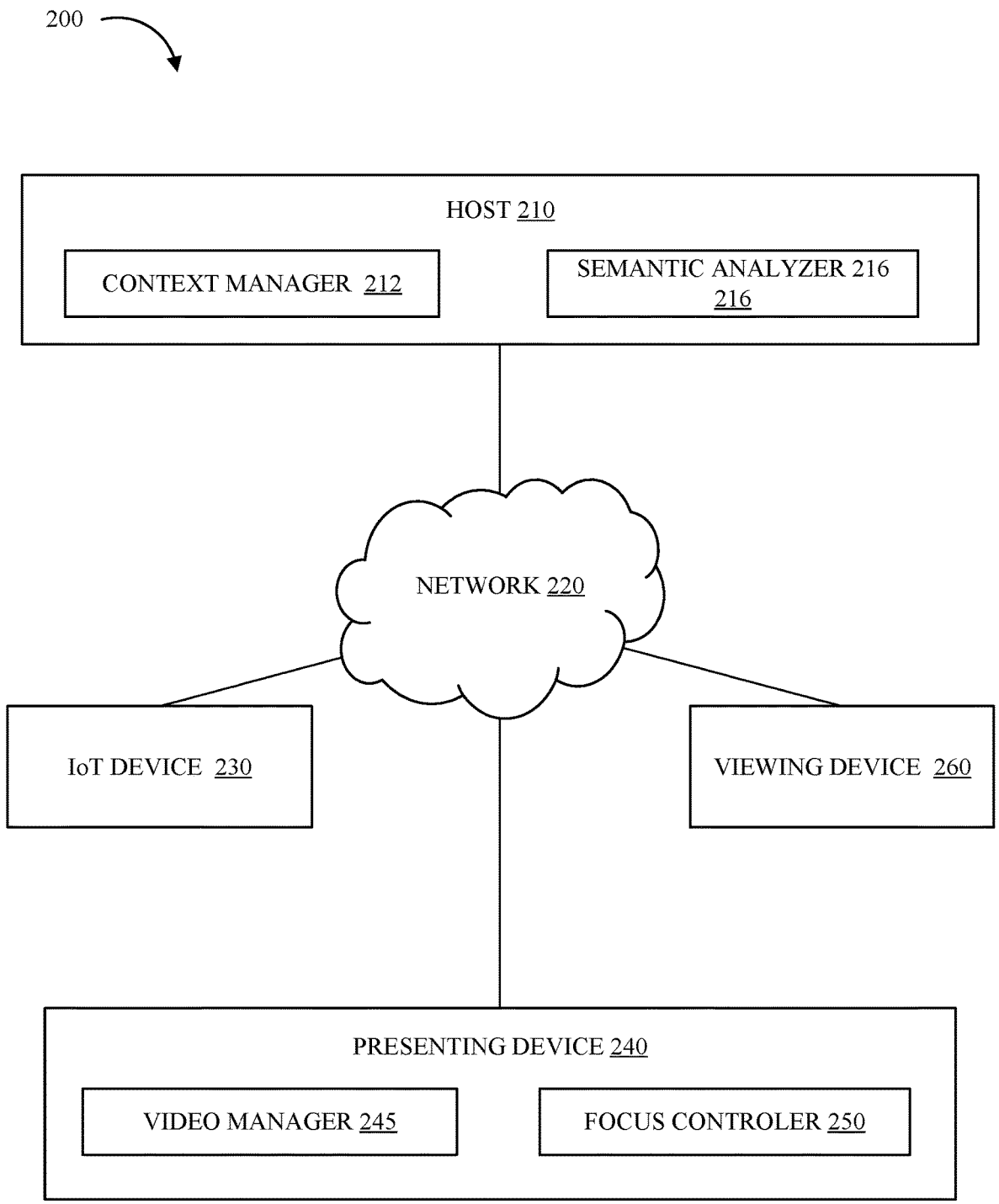
FIG. 2 depicts a block diagram of an example presenting device and communications system.

Referring now to various embodiments of the disclosure in more detail, FIG. 2 is a representation of Computing Environment 200, that is capable of running a video conference manager (or video manager) that is capable of adjusting the focus of a stream to a non-user item based on the context of the meeting. Many modifications to the depicted environment may be made by those skilled in the art without departing from the scope of the disclosure.

Computing Environment 200 includes host 210, network 220, IoT device 230, presenting device 240, and viewing device 260. network 220 can be, for example, a telecommunications network, a local area network (LAN), a wide area network (WAN), such as the Internet, or a combination of the three, and can include wired, wireless, or fiber optic connections. Network 220 may include one or more wired and/or wireless networks that are capable of receiving and transmitting data, voice, and/or video signals, including multimedia signals that include voice, data, and video information.

Network 220 includes IoT device 230. In some embodiments, IoT device 230 can be any number of IoT devices. In some embodiments, IoT device 230 may include computerized devices, such as personal computers, smartphones, servers, or the like. Two such devices may be networked together when one device is able to exchange information with the other device, whether or not they have a direct connection to each other. Two such devices may exchange data with each other using network 220. The connections between the devices may be established using either a wired connection, a wireless connection, or combination thereof. In some exemplary embodiments, network 220 may enable sharing of resources between devices connected thereto, such as a shared storage space, or the like. In general, network 220 may be any combination of connections and protocols that will support communications between and among host 210, IoT device 230, presenting device 240, viewing device 260, and other computing devices (not shown) within computing environment 200. In some embodiments, each of host 210, IoT device 230, presenting device 240, viewing device 260, and other devices not shown may include one or more computer systems, such as computer 101 of FIG. 1.

Host 210 can be a standalone computing device, a management server, a web server, a mobile computing device, or any other electronic device or computing system capable of receiving, sending, and processing data. In other embodiments, host 210 can represent a server computing system utilizing multiple computers as a server system, such as in a cloud computing environment (e.g., cloud environment 105 or 106). In some embodiments, Host 210 includes Context Manager 212 and Sematic Analyzer 216. In some embodiments, host 210 and/or any or all of the subcomponents of host 210 can be contained/included in presenting device 240.

Context Manager 212 can be any combination of hardware and/or software configured to determine the context of a video stream. In some embodiments, Context Manager 212 includes one or more sensors, detectors, and/or other devices configured for monitoring a user during a video conference. In some embodiments, context manager 212 monitors what the user is doing. In some embodiments, context manager 212 can determine one or more contexts/categories of the presentation. The context can change as an online meeting progresses. Said differently, a single meeting can have two or more topics at the same or different time throughout the meeting. In some embodiments, context manager 212 receives/uses data from various sensors on host 210, presenting device 240, and/or IoT device 230.

In some embodiments, context manager 212 can capture actions of a user during an event. It can monitor user activity, including gestures, facial expressions, movements, or specific objects. In some embodiments, context manager 212 can identify and track items within view of the presenting device.

In some embodiments, context manager 212 identifies predefined items as irrelevant. that certain items are not relevant and thus excluded from being a focused item as discussed in this disclosure. In some embodiments, the excluded items can be defined as an irrelevant item. In some embodiments, the irrelevant item can be given a relevance score of zero and/or a score that will never exceed the relevance threshold. The irrelevant items can be predefined by the user as irrelevant. For example, if the user is interacting with a drink during the presentation by drinking out of the container, context manager 212 will already have predefined that this item is not relevant, thus there will be no focus on the drink. Another example, if the user is interacting with a notepad during their presentation, context manager 212 will know not to enlarge the user looking at their notes as that has been predefined as not relevant to the presentation. A third example, a plant may be in the background, but because the plant is always in the users background it is defined as not being relevant.

Sematic Analyzer 216 can be any combination of hardware and/or software configured to monitor audible components of a presentation. In some embodiments, sematic analyzer 216 can be included in context manager 212. In some embodiments, semantic analyzer 216 can capture and interpret words spoken by the user. In some embodiments, semantic analyzer 216 identifies words that are related to items identified by context manager 212. In some embodiments, semantic analyzer 216 identifies one or more keywords spoken by the user. The keywords can be any word related to an identified item in the video feed.

In some embodiments, semantic analyzer 216 uses natural language processing (NLP). In some embodiments, a natural language processing system may include various components (not depicted) operating through hardware, software, or in some combination. For example, a natural language processor, one or more data sources, a search application, and a report analyzer. The natural language processor may be a computer module that analyses the received content and other information. The natural language processor may perform various methods and techniques for analyzing textual information (e.g., syntactic analysis, semantic analysis, etc.). The natural language processor may be configured to recognize and analyze any number of natural languages. In some embodiments, the natural language processor may parse passages of documents or content from semantic analyzer 216. Various components (not depicted) of the natural language processor may include, but are not limited to, a tokenizer, a part-of-speech (POS) tagger, a semantic relationship identifier, and a syntactic relationship identifier. The natural language processor may include a support vector machine (SVM) generator to processor the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents. Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor may be a computer module that may parse a document and generate corresponding data structures for one or more portions of the document. For example, in response to receiving a audio data from the user at presenting device 240 at the natural language processing system, the natural language processor may output parsed text elements from the data. In some embodiments, a parsed text element may be represented in the form of a parse tree or other graph structure. To generate the parsed text element, the natural language processor may trigger computer modules including the tokenizer, the part-of-speech (POS) tagger, the SVM generator, the semantic relationship identifier, and the syntactic relationship identifier.

IoT device 230 can be any device configured to capture and send data to host 210 and/or video manager 245. In some embodiments, computing environment 200 contains two or more separate IoT devices represented by IoT device 230. The two or more devices can be distributed around computing environment 200 where multiple devices are present (e.g., a home, office, etc.). In some embodiments, IoT device 230 has one or more sensors. The sensors can be of any type. Each sensor can be configured to collect one or more types of data. In some embodiments, IoT device 230 can perform and/or assist in identifying objects, and/or their relevance to a current context of the meeting. In some embodiments, IoT device 230 includes a camera. The camera can be used by video manager 245 to focus on a relevant item. For example, the camera on IoT device 230 can provide the feed being sent to receiving device 260.

Presenting device 240 can be a standalone computing device, a management server, a web server, a mobile computing device, or any other electronic device or computing environment capable of receiving, sending, and processing data. In other embodiments, host Presenting device 240 can represent a server computing environment utilizing multiple computers as a server system, such as in a cloud computing environment (e.g., cloud environment 105 or 106). In some embodiments, presenting device 240 includes video manager 245 and focus controller 250.

In some embodiments, presenting device 240 includes one or more cameras. The one or more cameras can be embedded into and/or an externally connected camera through input in presenting device 240. A primary camera may be directed towards the participant to provide a front view, and one or more secondary cameras can provide an overhead view. Other secondary cameras may be used to provide side views, zoom views, or any other view. Before adjusting the focus, the user can be shown a preview of the adjusted focus and decide whether to zoom in or not, and from what angle the user wants the item. In some embodiments, presenting device 240 can have a digital and/or an optical zoom. An optical zoom changes the positions of one or more lenses on the camera. The digital zoom can adjust the amount of data captured and/or sent to viewing device 260.

In some embodiments, presenting device 240 includes one or more of host 210, context manager 212, and semantic analyzer. In some embodiments, presenting device and/or host 210 can be a common computing device with all or some of the subcomponents of both devices.

Video manager 245 can be any combination of hardware and/or software configured to manage the data sent during a video conference. In some embodiments, video manager 245 can receive, send, and process data collected by Host 210 and/or IoT 230. In some embodiments, video manager 245 includes one or more of host 210, context manager 212, and semantic analyzer.

In some embodiments, video manager 245 calculates/generates a relevance score for an item. The item can be an item detected and/or tracked by context manager 212. The relevance score can represent a likelihood the item is a focus of the meeting at a particular time. In some embodiments, the relevance is based on data gathered by one or more sensors, host 210, and/or IoT device 230. The relevance value is determined by a correlation of an activity of a participant or movement of an object in the participant's video conference. The relevance value may be an indication of how relevant the activity is to conference participants, and thus, helps determine if the relevance threshold was exceeded.

In some embodiments, video manager 245 can determine if the relevance score is above a focus threshold (or threshold). The focus threshold can be predetermined and/or dynamic. In some embodiments, the threshold represents a point at which the focus of one or more cameras/video streams should be changed to the item associated with the relevance score. In some embodiments, each identified item can have a different threshold. The different thresholds can be the same and/or different values than any other threshold.

Focus controller 250 can be any combination of hardware and/or software configured to adjust a focus of a video stream. In some embodiments, focus controller 250 adjusts the focus to be centered on the user and/or one or more identified items. In some embodiments, focus controller 250 can alter the zoom (digital and/or optical zoom) and/or the stream that is sent to viewing device 260. In some embodiments, focus controller 250 can adjust the focus based on instruction from video manager 245.

In some embodiments, focus controller 250 can be configured to adjust the zoom without user intervention, to properly show the item in the view. In some embodiments, the adjustments can be in response to an input by the user. For example, video manager 245 can send a prompt on presenting device 240 to the user indicating the relevance score exceeds the threshold, the use may provide an input that allows focus controller 250 to adjust the zoom. Focus Controller 250 zoom's in to include the item in the view of the event if it is relevant and Context Manager 212 will continue to monitor the video conferencing event for other items that may exceed the relevance threshold.

Presenting device 240 sends the video to be viewed on viewing device 260. The video is displayed on the audience's screen to ensure adequate viewing when such focus regions are magnified for viewing by presenting device 240.

Figure 3:
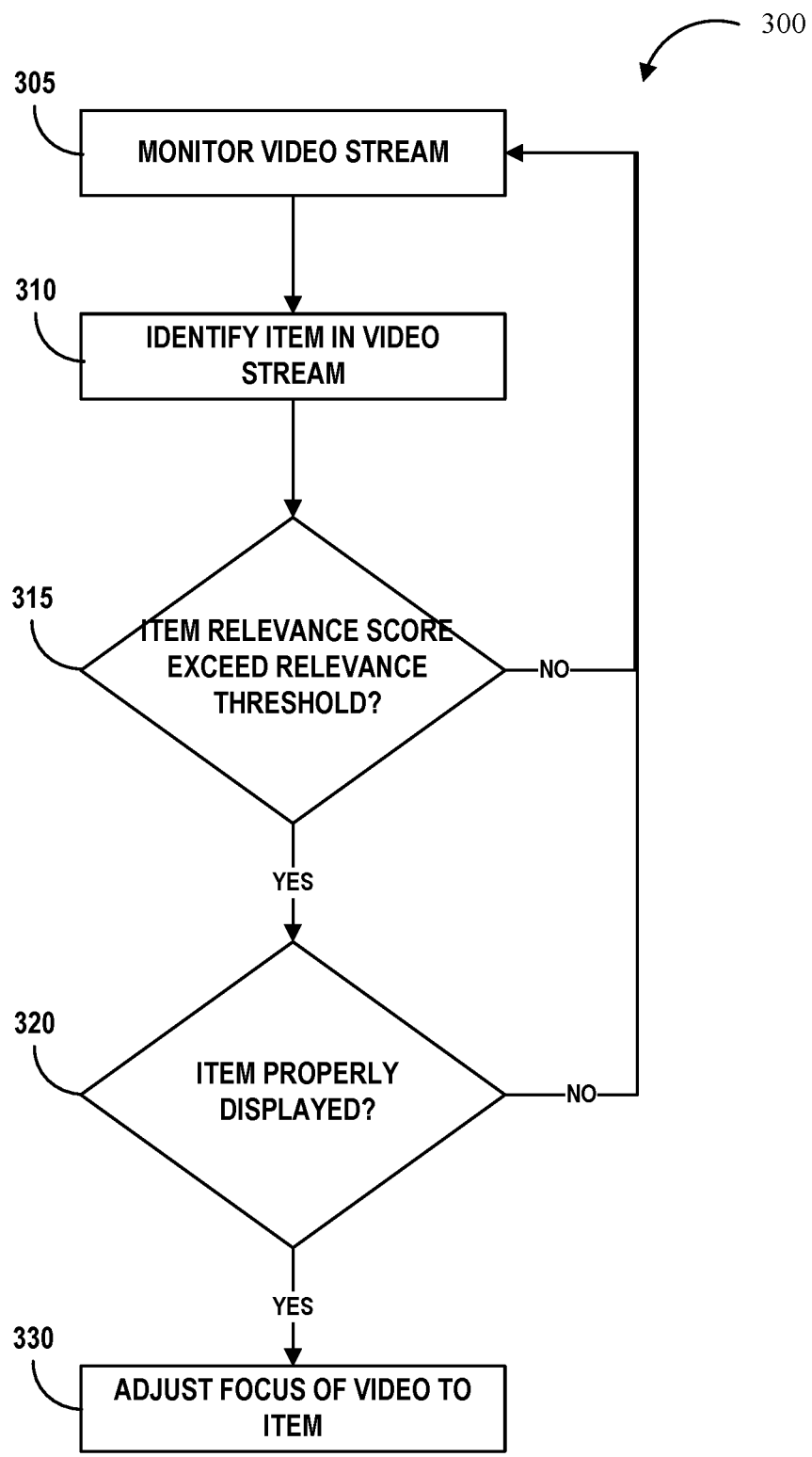
FIG. 3 is a flow chart of an example method to adjust the focus of a video conference to an item based on context, in accordance with some embodiments of the present disclosure.

FIG. 3 depicts a flowchart of an example method, method 300, automatically changing focus in an online meeting to a relevant object. One or more of the advantages and improvements described above for initiating analysis of the interaction may be realized by method 300, consistent with various embodiments of the present disclosure.

Method 300 can be implemented by one or more processors, host 210, context manager 212, semantic analyzer 216, IoT device 230, presenting device 240, video manager 245, focus controller 250, viewing device 260, and/or a different combination of hardware and/or software. In various embodiments, the various operations of process 300 are performed by one or more of host 210, context manager 212, semantic analyzer 216, IoT device 230, presenting device 240, video manager 245, focus controller 250, viewing device 260. For illustrative purposes, the process 300 will be described as being performed by video manager 245.

At operation 305, video manager 245 monitors a video stream in an online meeting. The video stream can be sent from presenting device 240 to at least one viewing device 260. In some embodiments, operation 305 includes monitoring a user during a video conferencing. In some embodiments, the monitoring includes capturing what a user says and/or physical movements of the user. Video manager 245 can monitor for activity, such as one or more gestures, facial expressions, movements, or specific objects. Detection of the activity may include motion detection, facial detection, gesture detection, object detection, or any combination thereof. The monitored data can be captured by one or more of host 210, IoT device 230, and presenting device 240. In some embodiments, the identified item can be outside of the video stream sent to viewing device 260.

At operation 310, video manager 245 identifies an item in the video stream. In some embodiments, operation 310 includes determining whether the user is interacting with an item by the gestures, facial expressions, movements, or specific objects. In some embodiments, operation 310 includes tracking the identified item. The tracking can include movement and/or discussion related to the item. In some embodiments, an item can be predetermined. For example, an item may be input by a user and/or included in an agenda for the meeting. In some embodiments, the item is identified based on object recognition from the video feed and/or other data.

In some embodiments, operation 310 include calculating/generating a relevance score for each item. The relevance score can be based on a context of the meeting and/or the movement, actions, and discussion of the user. The relevance score can represent a likelihood the object is focus of the meeting at that particular time. The relevance score can be updated as the time is more or less focused on during the meeting.

At operation 315, video manager 245 determines whether the item exceeds the relevance threshold. The relevance threshold can be static and/or dynamic. Operation 315 can include comparing the relevance score the relevance threshold for the item. If the relevance score exceed the relevance threshold (315: YES), then video manager 245 proceeds to operation 320. If the relevance score does not exceed the relevance threshold (315: NO), then host 210, context manager 212, semantic analyzer 216, IoT device 230, presenting device 240, video manager 245, focus controller 250, viewing device 260 return to operation 305. In some embodiments, operations 310-325 are performed for each identified object. The performance can be concurrent or sequential.

At operation 320, video manager 245 determines if the item is properly displayed. In some embodiments, properly displayed includes the item is fully visible in the video stream. In some embodiments, properly displayed means the item is centered in the video stream. In some embodiments, properly displayed includes the item taking up a predetermined amount of the video screen (e.g., at least 20% of the feed). If it is determined that the item is properly displayed (320: NO), then video manager 245 returns to operation 305. If it is determined the item is not properly displayed (320: YES), then video manager 245 proceeds to operation 330.

At operation 330, video manager 245 adjusts the focus to the item. In some embodiments, the adjustment is configured to make the item properly displayed. In some embodiments, the adjustment is configured to make the item centered in the display. the adjustment can be performed by focus controller 250. The adjustment can be based on one or more cameras changing position, switching cameras, optical zoom, digital zoom, and/or altering the feed sent to viewing device 260.

In some embodiments, video manager 245 returns to operation 305 upon completion of the adjustment. video manager 245 can continue to monitor the item and/or the context of the meeting. In some embodiments, the adjustment can be undone and/or the view can be returned to a default/previous/original position. The trigger for the new adjustment can be the relevance score falling below the threshold and/or a predetermined period of time.

Figure 4:
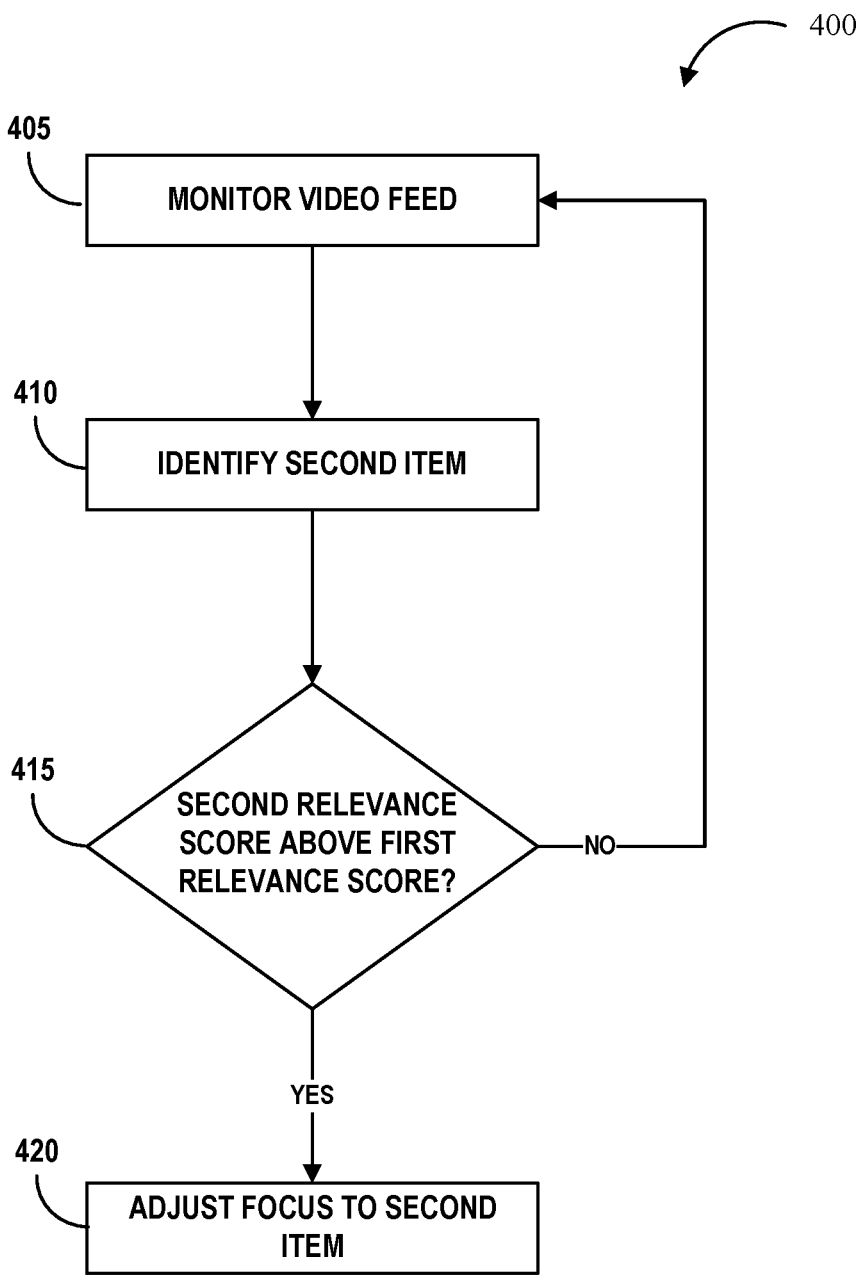
FIG. 4 is a flow chart of an example method to adjust focus between two items when the relevance of the items change, in accordance with some embodiments of the present disclosure.

FIG. 4 depicts a flowchart of an example method, method 400, for initiating zooming in on an item once it has been determined that the item exceeds the relevance threshold. At operation 405, focus controller 250 is focused on Item A. At operation 410, focus controller 250 identifies a new item in the field of view, item B. At operation 415, video manager 245 determines if the item has exceeded the relevant value threshold. At operation 420, focus controller 250 focuses on the new item, Item B.

FIG. 4 depicts a flowchart of an example method, method 400, automatically changing focus between two or more items in an online meeting. One or more of the advantages and improvements described above for initiating analysis of the interaction may be realized by method 400, consistent with various embodiments of the present disclosure.

Method 400 can be implemented by one or more processors, host 210, context manager 212, semantic analyzer 216, IoT device 230, presenting device 240, video manager 245, focus controller 250, viewing device 260, and/or a different combination of hardware and/or software. In various embodiments, the various operations of process 300 are performed by one or more of host 210, context manager 212, semantic analyzer 216, IoT device 230, presenting device 240, video manager 245, focus controller 250, viewing device 260. For illustrative purposes, process 400 will be described as being performed by video manager 245.

At operation 405, video manager 245 monitors a video feed. In some embodiments, operation 405 can include one or more steps of method 300. For example, the video feed can be focused on a first item, and the relevance score for the first item exceeds the first threshold. In some embodiments, operation 405 includes focusing the feed on the first time. In some embodiments, method 400 occurs after the method 300, where the video stream is focused on the first item.

At operation 410, video manager 245 identifies at least a second item. In some embodiments, operation 410 can be consistent with operation 305 and 310 from method 300. Video manager 245 will be monitoring for items and identify at least a second time in addition to the first item. In some embodiments, operation 410 includes determining a second relevance score for the second item and/or one or more additional relevance scores for each additional identified item. The determining the second relevance score can include updating a previously calculated relevance score for any/all identified items.

At operation 415, video manager 245 determines if the second relevance score exceeds the first relevance score. In some embodiments, operation 415 includes determining a relevance of the second item and that the second relevance score exceeds the relevance of the first item. In some embodiments, operation 415 includes comparing the relevance scores against each other. In some embodiments, the highest relevance score can be the most relevant. In some embodiments, the highest relevance can be based on a difference between the relevance threshold. For example, if the first relevance score is 0.83, the first threshold is 0.75, the second relevance score is 0.81 the second threshold is 0.8, then the second item can be considered to have a higher relevance, even though the actual relevance score is lower. In some embodiments, the higher relevance score can be based on the difference between the relevance score and the threshold. From the above example, the first item would be more relevant because the difference is greater.

If it is determined the relevance of the second item is greater than the relevance of the first item (415: YES), then video manager 245 proceeds to operation 420. If it is determined the relevance of the second item is not greater than the relevance of the first item (415: NO), then video manager 245 return to operation 405.

At operation 420, video manager 245 adjust the focus to the second item. In some embodiments, operation 420 can be consistent with operation 330, except the focus will be on a new item.

In some embodiments, video manager 245 returns to operation 405 upon completion of the adjustment. Video manager 245 can continue to monitor the item and/or the context of the meeting. In some embodiments, the adjustment can be undone and/or the view can be returned to a default/previous/original position. The trigger for the new adjustment can be the first and/or the second relevance score falling below the threshold and/or a predetermined period of time.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    monitoring activity in a video feed of a presenting device of a video conference;
    identifying, in the video feed, an item that a user is interacting with during the video conference;
    determining a relevance score for to the item, wherein the relevance score represents a likelihood the item is a focus of the video feed;
    determining the relevance score is above a relevance threshold for the item;
    adjusting, in response to the relevance score being above the relevance threshold, the focus of the video feed of the presenting device, wherein the adjusting is configured to focus on the item;
    determining the relevance score falls below the threshold at a second time; and
    adjusting, in response to the relevance score falling below the relevance threshold, a view to an original view of the video feed.

2. The computer-implemented method of claim 1, wherein the relevance score is based on keywords spoken by the user related to the item.

3. The computer-implemented method of claim 2, wherein the relevance score is based on a theme of the video feed.

4. The computer-implemented method of claim 3, wherein the relevance score is further based on activity, gestures, movements, and additional objects in the video feed and the activity, gestures, movement, and additional objects are observed by one or more sensors.

5. The computer-implemented method of claim 1, further comprising: monitoring and tracking, in response to the identifying the item, the item in the video feed.

6. The computer-implemented method of claim 1, wherein the adjusting a focus includes changing a zoom on a camera to enlarge the item.

7. The computer-implemented method of claim 1, wherein the adjusting the focus includes changing the video feed sent to a viewing device.

8. The computer-implemented method of claim 1, wherein an irrelevant item is predefined a relevance score of zero.

9. The computer-implemented method of claim 1, further comprising:
   identifying a new item is identified in the view;
   determining the new item has a second relevancy score that exceeds the relevancy threshold and the relevance score; and
   adjusting the focus of the video feed to focus on the new item.

10. The computer-implemented method of claim 1, wherein the adjusting is in response to an approval input from the user of the presenting device after a potential adjustment is shown to the user.

11. A system comprising:
    a processor; and
    a computer-readable storage medium communicatively coupled to the processor and storing program instructions which, when executed by the processor, are configured to cause the processor to:
      monitor activity in video feed of a presenting device of a video conference;
      identify, in the video feed, an item that a user is interacting with during the video conference;
      determine a relevance score for to the item, wherein the relevance score represents a likelihood the item is a focus of the video feed;
      determine the relevance score is above a relevance threshold for the item;
      adjust, in response to the relevance score being above the relevance threshold, the focus the video feed of the presenting device, wherein the adjusting is configured to focus on the item;
    determine the relevance score falls below the threshold at a second time; and
      adjust, in response to the relevance score falling below the relevance threshold, a view to an original view of the video feed.

12. The system of claim 11, wherein the program instructions are further configured to cause the processor to:
    identify a new item is identified in the view;
    determine the new item has a second relevancy score that exceeds the relevancy threshold and the relevance score; and
    adjusting the focus of the video feed to focus on the new item.

13. The system of claim 11, wherein the relevance score is based on keywords spoken by the user related to the item.

14. The system of claim 11, wherein an irrelevant item is predefined a relevance score of zero.

15. A computer program product, the computer program product comprising a computer readable storage medium having program instructions embodied therewith, the program instructions executable by a processing unit to cause the processing unit to:
    monitor activity in video feed of a presenting device of a video conference;
    identify, in the video feed, an item that a user is interacting with during the video conference;
    determine a relevance score for to the item, wherein the relevance score represents a likelihood the item is a focus of the video feed;
    determine the relevance score is above a relevance threshold for the item;
    adjust, in response to the relevance score being above the relevance threshold, the focus the video feed of the presenting device, wherein the adjusting is configured to focus on the item;
    identify a new item is identified in a view;
    determine the new item has a second relevancy score that exceeds the relevancy threshold and the relevance score; and
    adjust the focus of the video feed of the presenting device to focus on the new item.

16. The computer program product of claim 15, wherein the program instructions are further configured to cause the processing unit to:
    determine the relevance score and the second relevance score falls below the threshold at a second time; and
    adjust, in response to the relevance score falling below the relevance threshold, the view to an original view of the video feed.

17. The computer program product of claim 15, wherein the relevance score is based on keywords spoken by the user related to the item.

* * * * *